No. 717,681. PATENTED JAN. 6, 1903.
T. B. HODGE.
ODORIZED FISHING IMPLEMENT.
APPLICATION FILED JULY 7, 1902.
NO MODEL.

WITNESSES.
Charles T. Hannigan
Howard A. Lamprey

INVENTOR.
Thomas B. Hodge
By Warren R. Perce
Attorney.

UNITED STATES PATENT OFFICE.

THOMAS B. HODGE, OF PROVIDENCE, RHODE ISLAND.

ODORIZED FISHING IMPLEMENT.

SPECIFICATION forming part of Letters Patent No. 717,681, dated January 6, 1903.

Application filed July 7, 1902. Serial No. 114,602. (No model.)

*To all whom it may concern:*

Be it known that I, THOMAS B. HODGE, a citizen of the United States, residing at Providence, in the county of Providence and State of Rhode Island, have invented certain new and useful Improvements in Odorized Fishing Implements, of which the following is a specification, reference being had therein to the accompanying drawings.

Like letters indicate like parts.

Figure 1:
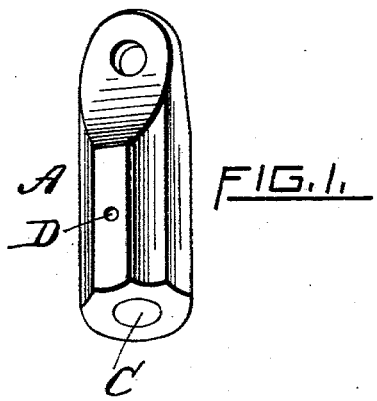
Figure 2:
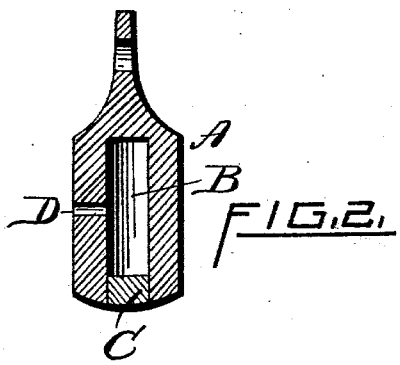

Figure 1 is a perspective view of a sinker embodying my invention. Fig. 2 is a central longitudinal section of the same.

My invention relates to sinkers for fish-lines; and it consists in making the same with an interior chamber having a suitable outlet for holding an odorizing substance and distributing it in the water for the purpose of attracting fish, as hereinafter particularly described, and specifically set forth in the claims.

In the drawings, A represents a sinker, preferably of lead and made in any suitable size and shape. It has a central longitudinal bore B, whose inner end is closed, and its outer end is stopped with a plug C. An outlet tube or aperture D extends from the bore B through the side of the sinker A.

In the bore B is placed asafetida or other odorous substance, the smell of which is agreeable to fishes, and said substance diluted by the water in which the sinker is submerged is distributed through the opening D and attracts the fishes to the bait and hook.

A paper wafer, plug, or stopper of any suitable kind may be used to close the opening D when the sinker is not in use and can be removed before the sinker is dropped into the water.

The plug C is temporarily removed in order to allow the introduction of the odorous substance into the chamber B and is then driven in tightly to close the outer end of said chamber. Said plug is detachable in order that the chamber may be refilled from time to time. The sinker in striking violently on the rocks when in use would be liable to have said aperture battered and closed up more or less, or even entirely, if it were not kept open by the tube, which is inserted therein, as shown.

I claim as a novel and useful invention and desire to secure by Letters Patent—

1. The improved sinker for fish-lines herein described, consisting of a head with a hole therein adapted to be attached to a line and a body portion having a bore with its upper end closed and its lower end open, which bore has an outlet therefrom through the side of the sinker, and a plug inserted in the lower end of said bore and closing the same, substantially as shown.

2. The improved sinker for fish-lines herein described, consisting of a head adapted to be attached to a line and a body portion having a bore with its upper end closed and its lower end open, which bore has an outlet therefrom through the side of the sinker, and a detachable plug inserted in the lower end of said bore and closing the same, substantially as specified.

3. The improved sinker for fish-lines herein described, consisting of a head adapted to be attached to a line and a body portion having a bore with its upper end closed and its lower end open, a plug inserted in the lower end of the bore, and an open tube extending through the side of the sinker into said bore, substantially as described.

In testimony whereof I affix my signature in presence of two witnesses.

THOMAS B. HODGE.

Witnesses:
 JOSEPH R. BULLOCK, Jr.,
 HOWARD A. LAMPREY.